United States Patent
Liezenberg et al.

(10) Patent No.: US 10,648,504 B2
(45) Date of Patent: May 12, 2020

(54) BEARING PRESSURE INDICATOR HAVING A PROXIMITY SWITCH ARRANGEMENT

(71) Applicant: Schlumberger Technology Corporation, Sugar Land, TX (US)

(72) Inventors: Bastiaan Liezenberg, Sugar Land, TX (US); Ronal MacInnes, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 333 days.

(21) Appl. No.: 15/568,782

(22) PCT Filed: Apr. 22, 2016

(86) PCT No.: PCT/US2016/028809
§ 371 (c)(1),
(2) Date: Oct. 23, 2017

(87) PCT Pub. No.: WO2016/172455
PCT Pub. Date: Oct. 27, 2016

(65) Prior Publication Data
US 2018/0087571 A1   Mar. 29, 2018

Related U.S. Application Data

(60) Provisional application No. 62/151,794, filed on Apr. 23, 2015.

(51) Int. Cl.
*F16C 19/52* (2006.01)
*E21B 33/02* (2006.01)
*E21B 33/068* (2006.01)
*E21B 34/02* (2006.01)
*E21B 33/08* (2006.01)
(Continued)

(52) U.S. Cl.
CPC ............ *F16C 19/52* (2013.01); *E21B 21/106* (2013.01); *E21B 33/03* (2013.01); *E21B 33/068* (2013.01); *E21B 33/085* (2013.01); *E21B 34/02* (2013.01)

(58) Field of Classification Search
None
See application file for complete search history.

(56) References Cited

U.S. PATENT DOCUMENTS

| 3,871,233 | A | | 3/1975 | Paramonoff et al. |
| 5,042,149 | A | * | 8/1991 | Holland .................. F04B 47/08 29/469 |

(Continued)

OTHER PUBLICATIONS

International Search Report and Written Opinion for the equivalent International patent application PCT/US2016/028809 dated Aug. 23, 2016.
(Continued)

*Primary Examiner* — Natalie Huls
*Assistant Examiner* — Jermaine L Jenkins
(74) *Attorney, Agent, or Firm* — Jeffrey D. Frantz

(57) ABSTRACT

A pressure indicator assembly disposed in a bearing has a first pressure relief valve and a first piston disposed in a first passage formed in a first component of the bearing and a first proximity switch disposed an initial distance away from the first piston. A first preset pressure value is set on the first pressure relief valve to indicate when pressure within the bearing is greater than or equal to the first preset pressure value.

18 Claims, 8 Drawing Sheets

(51) Int. Cl.
*E21B 33/03* (2006.01)
*E21B 21/10* (2006.01)

(56) References Cited

U.S. PATENT DOCUMENTS

| | | | | |
|---|---|---|---|---|
| 8,262,367 | B2* | 9/2012 | Watson | E21B 33/068 |
| | | | | 417/60 |
| 8,613,317 | B2 | 12/2013 | Briquet et al. | |
| 8,826,988 | B2* | 9/2014 | Gray | E21B 23/04 |
| | | | | 166/341 |
| 8,910,711 | B2* | 12/2014 | Hay | E21B 49/083 |
| | | | | 166/100 |
| 9,260,934 | B2* | 2/2016 | Godfrey | E21B 33/085 |
| 9,334,711 | B2* | 5/2016 | Hannegan | E21B 47/065 |
| 9,441,444 | B2* | 9/2016 | Ward | E21B 33/076 |
| 2008/0078586 | A1* | 4/2008 | Tettleton | E21B 21/106 |
| | | | | 175/317 |
| 2011/0024195 | A1* | 2/2011 | Hoyer | E21B 33/085 |
| | | | | 175/65 |
| 2011/0168382 | A1 | 7/2011 | Bailey et al. | |
| 2014/0138094 | A1 | 5/2014 | Hannegan et al. | |
| 2014/0166264 | A1 | 6/2014 | Judge et al. | |
| 2015/0308253 | A1* | 10/2015 | Clark | E21B 33/085 |
| | | | | 175/24 |

OTHER PUBLICATIONS

International Preliminary Report on Patentability for the equivalent International patent application PCT/US2016/028809 dated Nov. 2, 2017.

* cited by examiner

BEARING PRESSURE INDICATOR HAVING A PROXIMITY SWITCH ARRANGEMENT

CROSS-REFERENCE TO RELATED APPLICATION

The present document is based on and claims priority to U.S. Provisional Application Ser. No. 62/151,794, filed Apr. 23, 2015, which is incorporated herein by reference in its entirety.

BACKGROUND

Bearing assemblies may be used between moving parts to provide free movement between the parts and/or to limit movement between the parts. Because bearing assemblies are often used in dynamic environments, performance and the life of a bearing assembly may depend on changes in the dynamic environment, for example, the temperature, pressure, and contamination. In some cases, bearing assemblies may include one or more sealing elements, which may be used to prevent entry of contaminants, to maintain certain pressure conditions, and/or to grip or manipulate sealed components using friction.

For example, a bearing and seal assembly used in some drilling applications, referred to as a rotating control head or rotating control device ("RCD"), includes a bearing and seal assembly that enables rotation of a drill string and longitudinal motion of a drill string as the wellbore is drilled, while maintaining a fluid-tight seal between the drill string and the wellbore so that drilling fluid discharged from the wellbore may be discharged in a controlled manner. By controlling discharge of the fluid from the wellbore, a selected fluid pressure may be maintained in the annular space between the drill string and an exterior of the wellbore.

SUMMARY

In one aspect, embodiments of the present disclosure relate to a pressure indicator assembly disposed in a bearing, the pressure indicator assembly having a first pressure relief valve and a first piston disposed in a first passage formed in a first component of the bearing and a first proximity switch disposed an initial distance away from the first piston.

In another aspect, embodiments disclosed herein relate to a method of assembling a bearing pressure indicator that includes setting a first preset pressure value of a first pressure relief valve, positioning a first piston in a first position relative to an outlet side of the first pressure relief valve in a bearing when the pressure within the bearing at an inlet side of the first pressure relief valve is less than the first preset pressure value, and positioning a first proximity switch in the bearing to align with the first piston along a shared axis when the bearing is in a first orientation.

In yet another aspect, embodiments disclosed herein relate to a method of indicating a pressure within a bearing that includes using a first pressure indicator assembly disposed in the bearing to detect a first pressure value, the first pressure indicator comprising a first pressure relief valve, a first piston, and a first proximity switch, wherein the first piston moves in a direction away from an outlet side of the first pressure relief valve when the pressure within the bearing at an inlet side of the first pressure relief valve reaches a first preset pressure value, and wherein the first proximity switch indicates that the pressure within the bearing is greater than or equal to the first preset pressure value of the first pressure relief valve when the first piston moves towards the first proximity switch.

Other aspects of the invention will be apparent from the following description and the appended claims.

DETAILED DESCRIPTION

Embodiments disclosed herein may relate generally to pressure indicators. More particularly, some embodiments disclosed herein may relate to pressure indication assemblies and systems used to detect a pressure condition within a bearing assembly.

Figure 1:
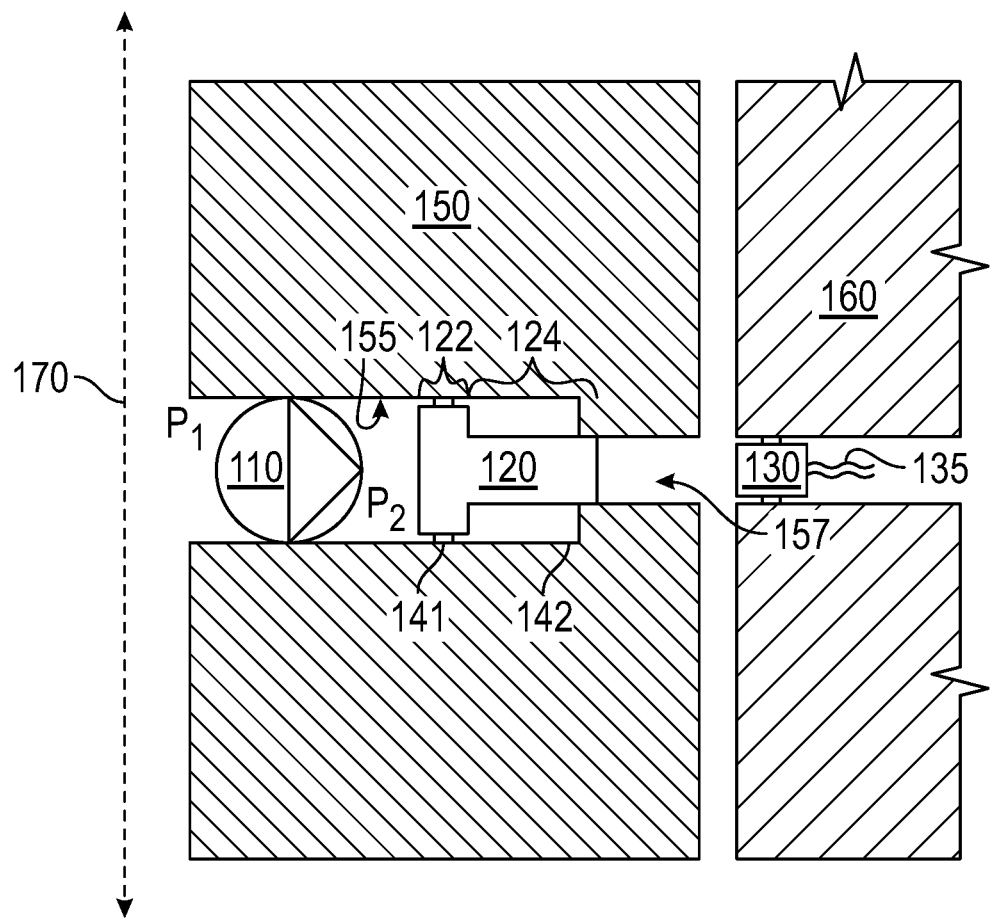
FIG. 1 is a cross sectional view of a pressure indication assembly according to embodiments of the present disclosure.

Pressure indication assemblies may include one or more pressure relief valves, one or more pistons, and one or more proximity switches which may be assembled in a manner having each of the one or more pistons positioned outward from an exterior or relief side of a pressure relief valve. For example, a schematic of a pressure indication assembly according to embodiments of the present disclosure is shown in FIG. 1, which includes a pressure relief valve 110, a piston 120, and a proximity switch 130. The pressure relief valve 110 and piston 120 may be assembled within a passage 155 of a first housing 150, and the proximity switch 130 may be assembled within a second housing 160. The first housing 150 may be a bearing assembly housing, which may rotate within the outer static housing 160 relative to axis of rotation 170. In embodiments where a first housing rotates relative to a second housing, the passages of the housings may be axially aligned such that the piston 120 and proximity switch 130 share an axial position along the axis of rotation 170. As the first housing 150 rotates, the opening 157 to the passage 155 of the first housing 150 may align with the proximity switch 130. However, in some embodiments, for use in different applications, a first and second housing may both be static or a first housing may move or rotate in other directions (e.g. hinge-like rotation, rotation in multiple directions, or restricted in one or more directions) relative to a second housing.

The pressure relief valve 110 has a preset pressure value greater than an initial, first pressure, $P_1$, interior to the pressure relief valve. When $P_1$ equals or exceeds the preset pressure value of the pressure relief valve 110, the pressure relief valve opens, such that a second pressure, $P_2$, between the pressure relief valve 110 and the piston 120 equalizes with $P_1$. In other words, when the first pressure $P_1$ interior to the pressure relief valve 110 equals or exceeds the preset pressure value of the pressure relief valve 110, the pressure relief valve 110 opens, and the second pressure $P_2$ exterior to the pressure relief valve 110 equalizes with $P_1$. As a result of the increase in $P_2$, the piston 120 moves in a direction towards the proximity switch 130 and away from the pressure relief valve 110. In embodiments having the first housing 150 rotate relative to the second housing 160, the proximity switch 130 may detect the piston 120 when the piston 120 is "pushed out" (moved outwardly, e.g., radially, from the opened pressure relief valve 110 due to an increase in pressure) and when the first housing 150 is rotated to a position where the passage opening 157 aligns with the proximity switch 130. In embodiments having the first housing 150 rotate relative to the second housing 160, more than one proximity switch 130 may be disposed around the inner surface of the second housing 160 and along a shared axial position so a pushed out piston 120 may be more readily detected. Likewise, in embodiments having the first housing 150 rotate relative to the second housing 160, more than one paired pressure relief valve 110 and piston 120 may be disposed in passages opening to an outer surface of the first housing 150 and along a shared axial position with one or more proximity switches 130 positioned around the inner surface of the second housing 160. In other words, a paired pressure relief valve 110 and piston 120 may be positioned azimuthally about the axis of rotation 170 from one or more paired pressure relief valve 110 and piston 120.

In embodiments having more than one paired pressure relief valve 110 and piston 120 disposed in passages 155 opening to an outer surface of a first housing 150 and along a shared axial position with one or more proximity switches 130, each of the pressure relief valves 110 may have the same preset pressure value. Once the first pressure $P_1$ interior to the pressure relief valves 110 equals or exceeds the preset pressure value, each of the pressure relief valves 110 may open, which may increase the pressure exterior to the pressure relief valves 110 and push the pistons 120 outwardly. By having multiple pushed out pistons 120 rotate with the first housing 150 at a shared axial position with one or more proximity switches 130 in a second housing 160, the increased pressure may be more readily detected.

In other embodiments having more than one paired pressure relief valve 110 and piston 120 disposed in passages 155 opening to an outer surface of a first housing 150 and along a shared axial position with one or more proximity switches 130, two or more of the pressure relief valves 110 may have different preset pressure values. In such embodiments, pistons 120 paired with the pressure relief valves 110 having different preset pressure values may be of different types that correspond with different types of proximity switches 130. Once the first pressure $P_1$ interior to the pressure relief valves 110 equals or exceeds each of the preset pressure values, each of the pressure relief valves 110 may open, which may increase the pressure exterior to the pressure relief valves 110 and push the pistons 120 outwardly. As each of the pistons 120 push out, a corresponding proximity switch 130 may detect the pushed out piston 120, and thus indicate when a preset pressure value has been reached. By having pistons 120 push out at multiple preset pressure values, multiple preset pressure values, or a pressure range within the bearing assembly, may be detected.

The movement of a piston within a passage may be restricted, for example, by a non-uniform shape or size of the passage in which the piston is disposed or by a blocking element positioned at a side of the piston opposite from the pressure relief valve. In the embodiment shown in FIG. 1, the piston 120 has a head portion 122 and a shaft portion 124, the diameter of the shaft being smaller than the diameter of the head, and the passage 155 has a first inner diameter and a second inner diameter corresponding with the head and shaft diameters, respectively. As the piston 120 moves away from the pressure relief valve 110, the relatively larger diameter of the head portion 122 of the piston 120 is blocked by a shoulder formed between the relatively larger first inner diameter of the passage 155 and the relatively smaller second inner diameter of the passage 155, such that the head portion of the piston 120 does not move past the second inner diameter of the passage 155. Other shapes and sizes of passages or restrictions placed inside the passages and corresponding pistons may be used without departing from the scope of embodiments disclosed herein. Further, while passage 155 may be described as cylindrical in shape, other shaped passages, such as rectangular prisms, triangular prisms, etc. may also be used without departing from the scope of embodiments disclosed herein.

As shown in FIG. 1, the piston head 122 may be in a first position 141 within the passage prior to opening of the pressure relief valve 110 and moves to a second position 142 within the passage after opening the pressure relief valve 110. The piston 120 may be held initially in the first position 141, for example, using a weak spring, frictional forces from between the wall of the passage 155 and the contacting outer surface of the piston head portion, a weak adhesive, or by using other means of temporary attachment or temporary restriction that may be overcome by a pressure greater than or equal to the preset pressure value of the pressure relief valve 110. The second position 142 may be selected based on the length of the shaft portion 124 of the piston 120 such that once the piston 120 is pushed out to the second position 142 (and blocked from being pushed out any farther), the piston 120 does not extend past the opening 157. In other words, the distance between the second position 142 and the outer surface of the housing 150 at opening 157 may be greater than or equal to the length of the shaft portion 124 of the piston 120.

The proximity switch 130 detects the change in pressure upon the piston 120 moving proximate to or adjacent to the proximity switch 130. Depending on the type of proximity switch used, a detection distance between the proximity switch 130 and the piston 120 for detecting the piston movement (and thus increase in pressure) may range, for example, from less than 1 in (2.54 cm), less than 0.5 in (1.27 cm), or less than 0.25 in (6.35 mm) to 0 in (where the piston is adjacent the proximity switch). Detection of the piston 120 by the proximity switch 130 indicates that the first pressure, $P_1$, is greater than or equal to the preset value of the pressure relief valve 110. The proximity switch 130 may transmit a signal from the proximity switch 130, indicating that the piston 120 has been detected to a user or device, such as a computer or control center, by wires 135 or wirelessly.

Proximity switches that may be used in pressure indication assemblies according to embodiments of the present disclosure include, for example, switches with electromagnetic field, electromagnetic radiation (e.g., infrared), capacitive, photoelectric or inductive sensing mechanisms, to name a few. For example, a proximity switch may be an electrical switch operated by an applied magnetic field (e.g., a magnet disposed at a proximate side of a piston). Other embodiments may use other known types of proximity switches, depending on, for example, the application of the pressure indication system, the type of piston used, the level of accuracy desired, etc.

Although the pressure indication assembly is shown in FIG. 1 as being assembled across two housings, other embodiments for different applications may have a pressure indication assembly assembled within a single housing. For example, a single housing may have at least one passage that has assembled therein a pressure relief valve, a piston and a proximity switch. The proximity switch may be placed at an initial distance away from the piston, and upon movement of the piston due to increased pressure (from opening of the pressure relief valve, as discussed above), the piston moves outwardly, e.g., radially, to a distance close enough to the proximity switch for the proximity switch to detect the piston, and thus, detect an increase in pressure equal to or greater than the preset pressure of the pressure relief valve.

Pressure relief valves used for pressure indication according to embodiments of the present disclosure may include valves or devices that expand or open due to increased pressure. For example, pressure relief valves may include spring loaded relief valves, diaphragm-type relief valves, weight sealed relief valves, and others known in the art, depending on the application the pressure indication system is being used in and the accuracy of the preset pressure value desired. Pressure relief valves may be micro-sized or larger, depending on the size of the passage in which the pressure relief valve is fitted. Further, pressure relief valves may have preset pressure values (also may be referred to as opening pressure) that vary by orders of magnitude, depending on the application of the pressure indication system. For example, to determine pressure values in a downhole apparatus, a pressure relief valve may have one or multiple preset pressure values including but not limited to preset pressure values ranging between 0 and 2,000 psi.

Figure 2:
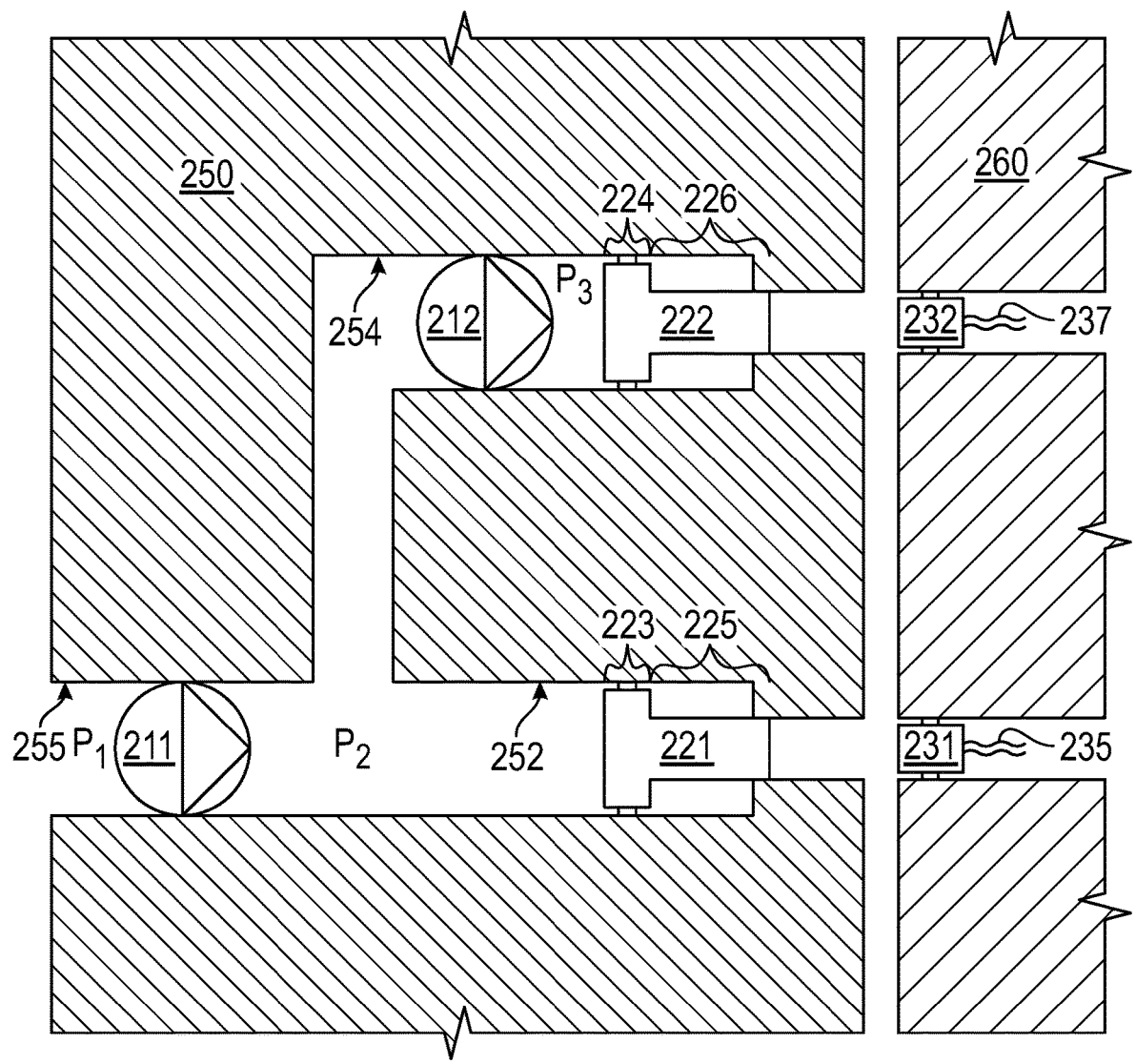
FIGS. 2-4 show a cross sectional view of a multi-tier pressure indication system according to embodiments of the present disclosure.
Figure 3:
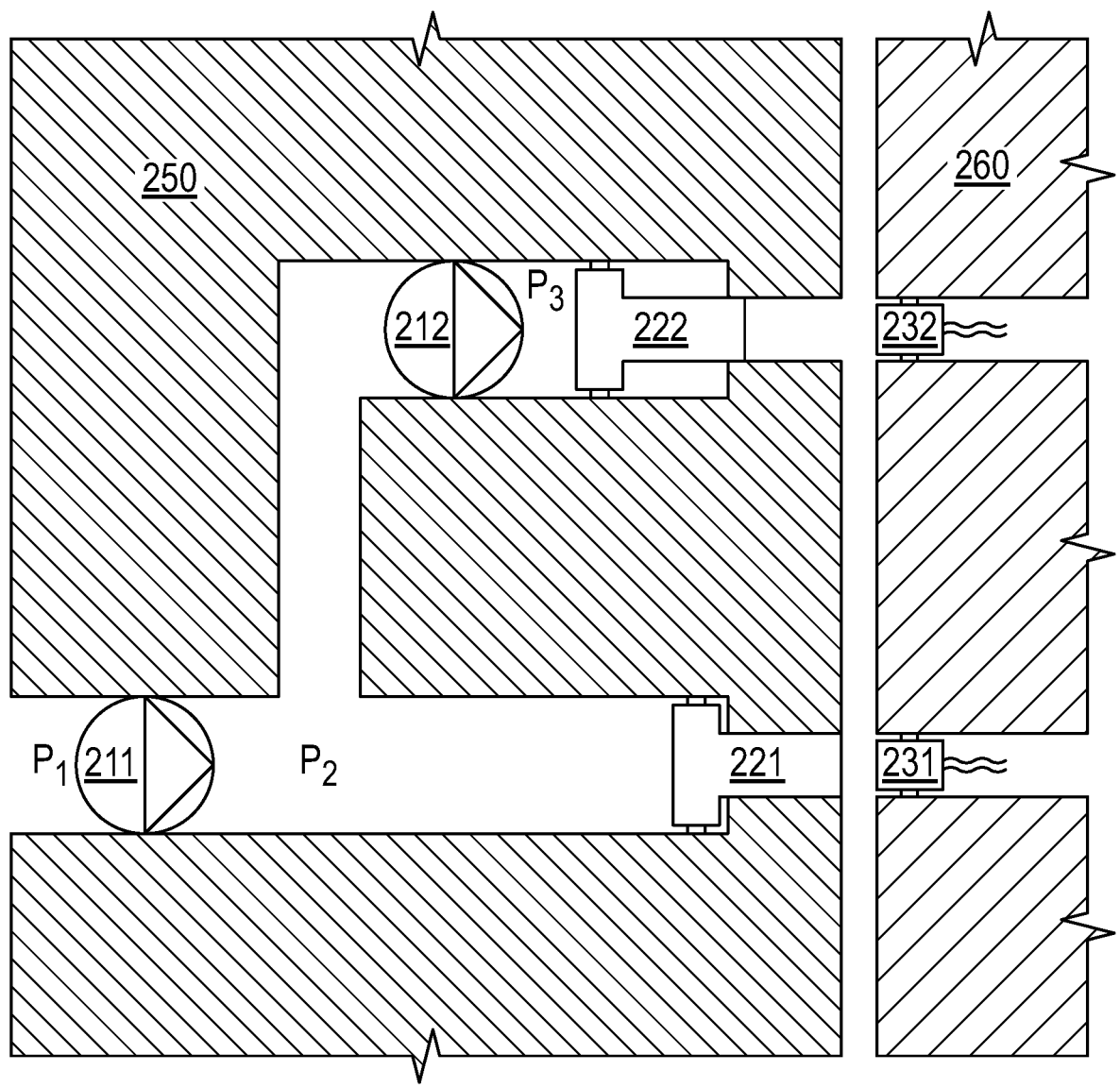
Figure 4:
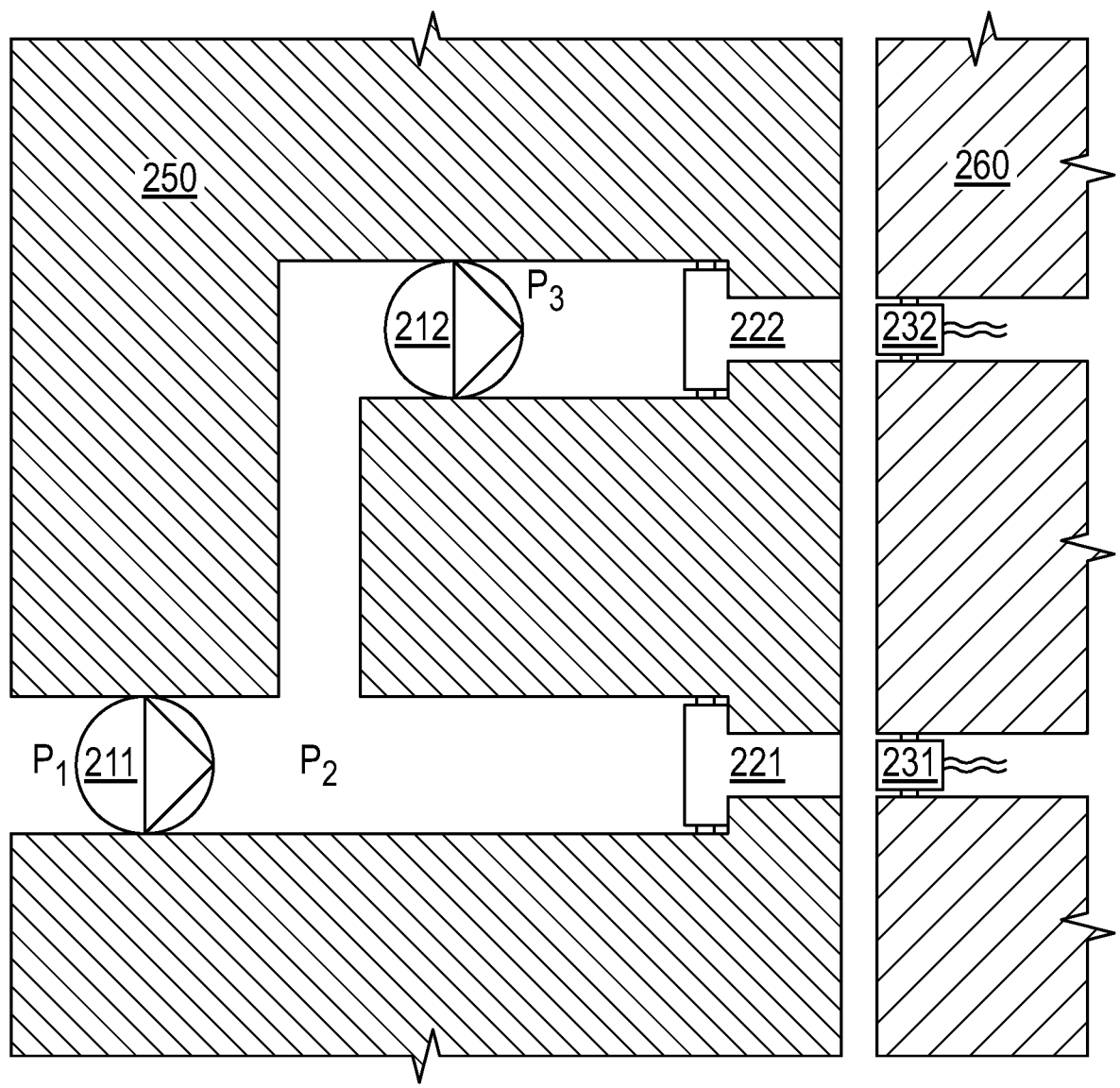

Referring now to FIGS. 2-4, a multi-tier pressure indication system is shown, where multiple pressure indication assemblies are provided in an interior and exterior housing. The interior housing 250 has a passage 255 that divides into two parallel passages 252, 254, where a first pressure indication assembly is provided through the passages 255, 252 and a second pressure indication assembly is provided through the passage 254. The first pressure indication assembly includes a first pressure relief valve 211, a first piston 221, and a first proximity switch 231. The second pressure indication assembly includes a second pressure relief valve 212, a second piston 222, and a second proximity switch 232.

The first pressure relief valve 211 has a first preset pressure value. When the pressure, $P_1$, to the interior of the first pressure relief valve 211 equals or exceeds the first preset pressure value of the first pressure relief valve 211, the first pressure relief valve 211 opens, such that the pressure, $P_2$, exterior of the first pressure relief valve equalizes with $P_1$. As a result of the increase in $P_2$, the first piston 221 moves in a direction towards the first proximity switch 231 and away from the first pressure relief valve 211. The first piston 221 has a head portion 223 and a shaft portion 225, the diameter of the shaft smaller than the diameter of the head, and the passage 252 in which the first piston 221 is disposed has a first inner diameter and a second inner diameter corresponding with the head and shaft diameters, respectively. As shown in FIG. 3, when the first piston 221 moves away from the first pressure relief valve 211, the relatively larger diameter of the head portion 223 of the first piston 221 is blocked by a shoulder formed between the relatively larger first inner diameter of the passage 252 and the relatively smaller second inner diameter of the passage 252, such that the head portion of the first piston 211 does not move past the second inner diameter of the passage 252. However, according to other embodiments of the present disclosure, other means for restricting movement of the first piston may be used, for example, by having a blocking element attached within or formed within the passage that partially restricts a side of the first piston facing the proximity switch. The first proximity switch 231 detects the first preset pressure value upon the first piston 221 moving proximate to the first proximity switch 231. The first proximity sensor 231 may transmit a signal from the first proximity sensor 231 indicating that the first piston 221 has been detected to a user or device, such as a computer or control center, by wires 235 or wirelessly.

The second pressure relief valve 212 has a second preset pressure value higher than the first preset pressure value. When the pressure to the interior, $P_2$, of the second pressure relief valve 212 (and therefore the pressure to the interior, $P_1$, of the first pressure relief valve 211) equals or exceeds the second preset pressure value of the second pressure relief valve 212, the second pressure relief valve 212 opens, such that the pressure exterior, $P_3$, of the second pressure relief valve 212 equalizes with $P_2$. As a result of the increase in $P_3$, the second piston 222 moves in a direction towards the second proximity switch 232 and away from the second pressure relief valve 212. The second piston 222 has a head portion 224 and a shaft portion 226, the diameter of the shaft smaller than the diameter of the head, and the passage 254 in which the second piston 222 is disposed has a first inner diameter and a second inner diameter corresponding with the head and shaft diameters, respectively. As shown in FIG. 4, when the second piston 222 moves away from the second pressure relief valve 212, the relatively larger diameter of the head portion of the second piston 222 is blocked by a shoulder formed between the relatively larger first inner diameter of the passage 254 and the relatively smaller second inner diameter of the passage 254, such that the head portion 224 of the second piston 212 does not move past the second inner diameter of the passage 254. However, according to other embodiments of the present disclosure, other means for restricting movement of the second piston may be used, for example, by having a blocking element attached within or formed within the passage that partially covers the side of the second piston facing the proximity switch. The second proximity switch 232 detects the second preset pressure value upon the second piston 222 moving proximate to the second proximity switch 232. The second proximity sensor 232 may transmit a signal from the second proximity sensor 232 indicating that the second piston 222 has been detected to a user or device, such as a computer or control center, by wires 237 or wirelessly.

The multi-tier pressure indication system shown in FIGS. 2-4 may detect multiple preset pressure values, where a different preset pressure value is detected at each "tier" of the pressure indication system. In the embodiment shown in FIGS. 2-4, the pressure indication system includes two tiers, detecting a first preset pressure value and a second preset pressure value, where the second preset pressure value is higher than the first preset pressure value. As shown, each "tier" may be positioned within a housing at a different axial location. In some embodiments, the interior housing 250 including multiple pressure indication assemblies may be rotatable within an outer static housing 260. In such embodiments, multiple branched passages 252, 254 having a first pressure indication assembly detecting a first preset pressure value and a second pressure indication assembly detecting a second preset pressure value may be distributed radially around the rotatable housing 250 and/or multiple first and second proximity switches 231, 232 may be distributed radially around the inner surface of the static housing 260, where the axial position of each proximity switch along the axis of rotation at least partially overlaps with the axial position of one or more pistons. By using multiple pistons and/or multiple proximity switches, the preset pressure values may be more readily detected.

By setting the first pressure relief valve 211 and second pressure relief valve 212 at different preset pressure values, a pressure range within the bearing assembly may be detected. The detected pressure range may be used in combination with other measured parameters to calculate various environmental parameters of the bearing assembly. For example, the time between detecting the first preset pressure value and detecting the second preset pressure value may indicate a rate at which pressure is rising. Further, in embodiments using multiple pressure indication assemblies to detect multiple preset pressure values in a downhole apparatus, the depth of descent of the downhole apparatus may be measured between detecting a first preset pressure value and detecting a second preset pressure value, which may be used, for example, to determine changing downhole conditions and/or pressure effect on the bearing assembly from the downhole conditions.

Further, although the multi-tier assembly shown in FIGS. 2-4 includes two tiered pressure indication assemblies (where a first pressure indication assembly is distributed at a first axial position and includes a first pressure relief valve 211, a first piston 221 and a first proximity switch 231, and a second pressure indication assembly is distributed at a second axial position and includes a second pressure relief valve 212, a second piston 222 and a second proximity switch 232), other embodiments may include more than two tiered pressure indication assemblies, e.g., three, four, or more, where a different preset pressure value may be detected at each tier or shared axial position.

For example, according to embodiments of the present disclosure, a multi-tier pressure indication system may include a first housing having a first pressure relief valve and a first piston distributed in a first passage, a second pressure relief valve and a second piston distributed in a second passage branched off from the first passage between the first pressure relief valve and the first piston, and a third pressure relief valve and a third piston distributed in a third passage branched off from the second passage between the second pressure relief valve and the second piston. Likewise, in some embodiments, the first housing may also have a fourth pressure relief valve and a fourth piston distributed in a fourth passage branched off from the third passage between the third pressure relief valve and the third piston. By branching each different passage from a position between the prior passage's pressure relief valve and piston, incremental pressure increases may be determined.

Figure 5:
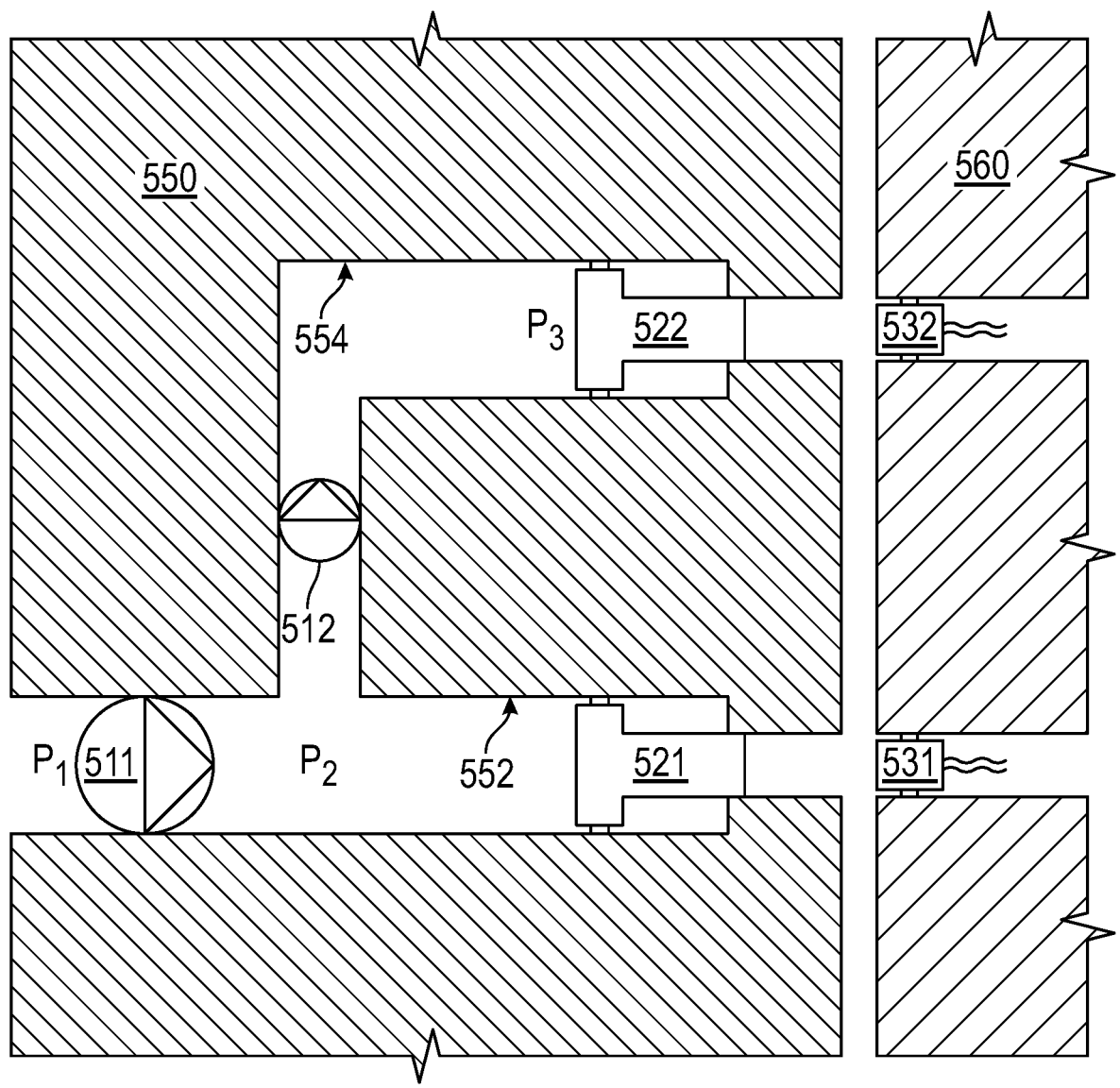
FIG. 5 is a cross sectional view of a multi-tier pressure indication system according to embodiments of the present disclosure.

As used herein, the term "axial" may refer to a direction parallel to an axis of rotation. However, in embodiments having a bearing assembly exhibit relative movement between components other than an inner housing rotating within an outer housing, the term "axial" may refer to a direction along a dimension of the bearing assembly. Further, although each pressure indication assembly shown in FIGS. 2-4 is distributed along a shared axial position, other embodiments may have a pressure relief valve out-of-line or along a different axial position than a corresponding piston and proximity switch. For example, referring to FIG. 5, a first housing 550 of a multi-tier pressure indication system has a first pressure relief valve 511 and a first piston 521 disposed in a first passage 552 and a second pressure relief valve 512 and a second piston 522 disposed in a second passage 554, where the second passage 554 branches from the first passage 552 between the first pressure relief valve 511 and the first piston 521. A first proximity sensor 531 is in a second housing 560 and aligned with the opening of the first passage 552 and the first piston 521, such that the first piston 521 and the first proximity sensor 531 share an axial position. A second proximity sensor 532 is in the second housing 560 and aligned with the opening of the second passage 554 and the second piston 522, such that the second piston 522 and the second proximity sensor 532 share an axial position. In the embodiment shown, the first pressure relief valve 511 shares an axial position with the first piston 521 and the first proximity sensor 531, while the second pressure relief valve 512 does not share an axial position with the second piston 522 or second proximity sensor 532. As shown, the second pressure relief valve 512 is positioned at an axial position between the axial position of the first piston 521 and first proximity sensor 531 and the axial position of the second piston 522 and the second proximity sensor 532. In other embodiments, more than one or each pressure relief valve in a bearing assembly having multiple pressure indication assemblies may be positioned at an axial position different from the axial position shared by a corresponding piston and proximity sensor.

According to some embodiments of the present disclosure, multiple pressure indication assemblies may be used to detect multiple pressure changes within a bearing assembly. For example, a first preset pressure value may be detected with a first pressure indication assembly, a second preset pressure value may be detected with a second pressure indication assembly, a third preset pressure value may be detected with a third pressure indication assembly, and so forth, where the different pressure indication assemblies may be in a multi-tier structure and/or may be assembled in separated positions along the bearing assembly (e.g., one or more paired pressure relief valves and pistons positioned in separated passages at different axial and or radial positions within a first housing). In multi-tier pressure indication systems, the preset pressure value for one or more upper tiers may be higher than the preset pressure value for a lower tier. For example, in some multi-tier embodiments, the preset pressure values may be set as increasing values, where the pressure indication assembly in each subsequently higher tier indicates a higher pressure than the pressure indication assembly in the previous tier.

Figure 6:
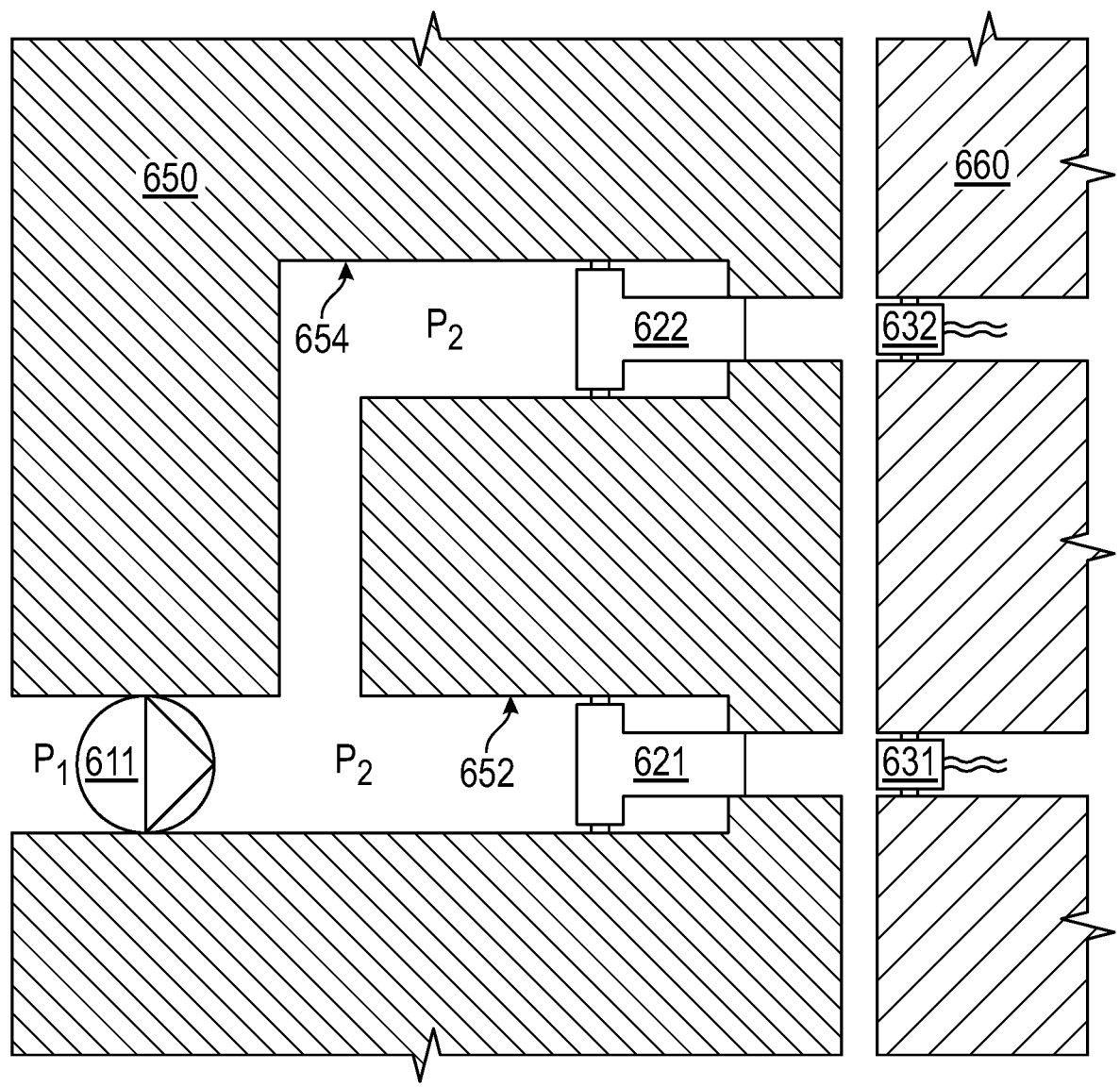
FIG. 6 is a cross sectional view of a pressure indication system according to embodiments of the present disclosure.

Further, according to some embodiments of the present disclosure, a pressure indication assembly may include more than one piston and/or proximity sensor to detect a single preset pressure value. For example, referring to FIG. 6, a schematic of a bearing assembly having a pressure indication assembly including more than one piston and proximity sensor to detect a single preset pressure value is shown. The bearing assembly includes a first housing 650 having a pressure relief valve 611, a first piston 621 and a second piston 622 and a second housing 660 having a first proximity sensor 631 and a second proximity sensor 632. The first piston 621 is disposed in a first passage 652, and the second piston 622 is disposed in a second passage 654 that diverges from the first passage 652 between the pressure relief valve 611 and the first piston 621. When the pressure, $P_1$, interior to the pressure relief valve 611 equals or exceeds a preset pressure value of the pressure relief valve 611, the pressure relief valve 611 opens and the pressure, $P_2$, exterior to the pressure relief valve 611 equalizes with $P_1$. The increase in pressure of $P_2$ moves both the first piston 621 and the second piston 622 away from the pressure relief valve 611 and towards the openings of their respective passages. The first housing 650 may be aligned with the second housing 660, such that the first piston 621 is aligned with the first proximity sensor 631 and the second piston 622 is aligned with the second proximity sensor 632. Upon the pistons 621, 622 being pushed out and aligned with one or both of the proximity sensors 631, 632, the proximity sensors 631, 632 detect the change in pressure. Other configurations of diverging passages and other amounts of pistons and/or proximity sensors may be used, where a single pressure relief valve may push out two or more pistons when an interior pressure reaches or exceeds the preset pressure value of the pressure relief valve. By using a single pressure relief valve to push out two or more pistons, the change in pressure may be more readily detected by one or more corresponding proximity sensors. Use of multiple pistons and proximity sensors with a single pressure relief valve may also provide redundancy in the system to ensure detection of a pressure change even when one component of the system, such as a proximity sensor, fails.

Figure 7:
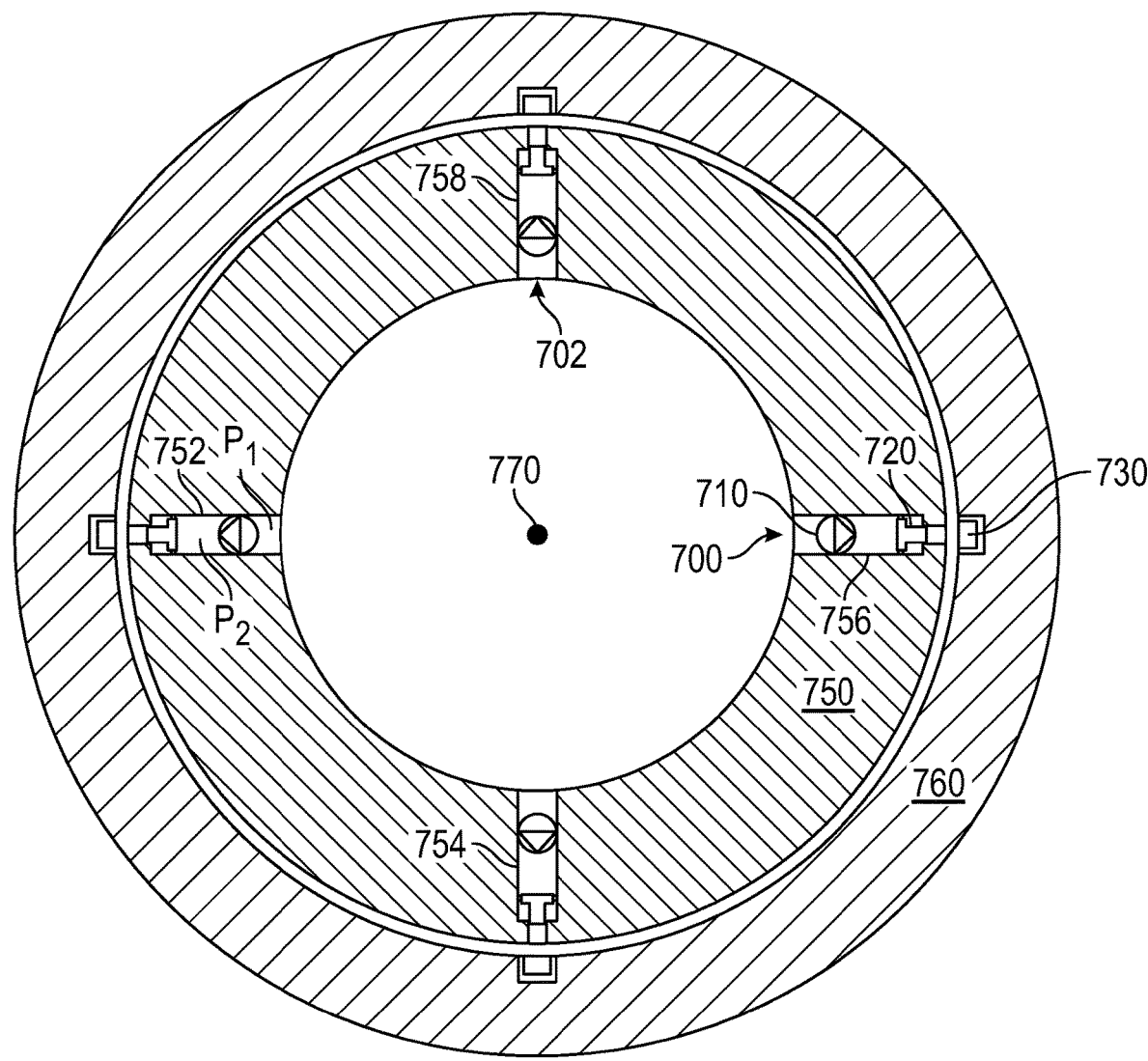
FIG. 7 shows a cross sectional view of a bearing assembly having multiple pressure indication assemblies according to embodiments of the present disclosure.

According to some embodiments of the present disclosure, multiple pressure indication assemblies may be used to detect multiple pressure changes within a bearing assembly or may be used to detect a single preset pressure value, where the different pressure indication assemblies may be assembled in separated positions within the bearing assembly (e.g., one or more paired pressure relief valves and pistons positioned in separated passages at different axial and or radial positions within a first housing). For example, referring now to FIG. 7, a partial cross sectional view of a bearing assembly having multiple pressure indication assemblies assembled in separated positions is shown. The bearing assembly includes a first housing 750 that is rotatable within a second housing 760 along an axis of rotation 770. The first housing 750 has four separated passages 752, 754, 756, 758 extending from an interior of the bearing assembly to an outer surface of the first housing, where each passage has a pressure relief valve 710 and a piston 720. The second housing 760 has a plurality of proximity sensors 730 inset from the inner surface of the second housing and disposed at different radial positions. In the embodiment shown, each pressure indication assembly is assembled along a shared axial position (the axial position at which the cross section is taken). However, in other embodiments, pressure indication assemblies may be assembled at different axial positions in addition to or in the alternative to different radial positions.

The pressure relief valves 710 may be set to the same preset pressure value, such that when the pressure interior, $P_1$, to the pressure relief valves 710 meets or exceeds the preset pressure value, each pressure relief valve 710 will open at or about the same time. As each pressure relief valve opens, the pressure exterior, $P_2$, to the pressure relief valves 710 (i.e., the pressure between the piston 720 and pressure relief valve 710) equalizes with the pressure interior, $P_1$, to the pressure relief valves 710. The increase in pressure, $P_2$, between the pressure relief valve 710 and the piston 720 pushes the piston 720 outwardly, away from the pressure relief valve 710. Each piston 720 may be pushed out to a predetermined distance, at which position the piston 720 may be held or further radial movement limited using a blocking element on a side of the piston 720 opposite from the side of the piston that was pushed by the increased interior pressure. The predetermined distance may be designed where, in the pushed out position, the piston may be proximate to a proximity sensor 730 when the piston aligns with the proximity sensor. By using multiple pressure indication assemblies within the bearing assembly, a change in pressure to the preset pressure value may be more readily detected. For example, in the embodiment shown in FIG. 7, when the interior pressure, $P_1$, reaches or exceeds the preset pressure value, four pistons 720 may be pushed out, and four proximity sensors are disposed in a shared axial position to detect the pushed out pistons. The increased number of pistons may be more likely to be detected by the increased number of proximity sensors when compared to a similarly configured bearing assembly having less than four pistons and proximity sensors along a shared axial position.

In other embodiments, two or more of the pressure relief valves of pressure indication assemblies assembled in separated positions within the bearing assembly may be set to a different preset pressure value. For example, two, three or four of the pressure relief valves 710 in the embodiment shown in FIG. 7 may be set at different preset pressure values. In such embodiments, the pressure relief valves 710 open at different times, as the pressure interior $P_1$ to the pressure relief valves 710 increases to each different preset pressure value. As each pressure relief valve 710 opens, the pressure exterior $P_2$ to the pressure relief valves 710 (i.e., the pressure between the piston 720 and pressure relief valve 710) equalizes with the pressure interior $P_1$ to the pressure relief valves 710. The increase in pressure $P_2$ between the pressure relief valve 710 and the piston 720 pushes the piston 720 outwardly, away from the pressure relief valve 710, which may then be detected by a proximity sensor 730 upon alignment between a pushed out piston 720 and proximity sensor 730.

Each piston 720 corresponding with a pressure relief valve 710 having a different preset pressure value may be different (e.g., made of a different material, have a different size or shape, etc.) and designed to be detected by a particular proximity sensor 730. For example, a first pressure indication assembly 700 may have a first pressure relief valve set to a first preset pressure value, a first piston and a first proximity sensor, where the first proximity sensor is configured to detect the first piston at a predetermined distance. A second pressure indication assembly 702 may have a second pressure relief valve set to a second preset pressure value (higher than the first preset pressure value), a second piston, and a second proximity sensor, where the second proximity sensor is configured to detect the second piston at a predetermined distance. For example, the first proximity sensor may be a different type of proximity sensor than the second proximity sensor, where each proximity sensor detects a different type of target (the first and second pistons, respectively). In such embodiments, the first proximity sensor may detect the first preset pressure value when the first piston is pushed out and aligned with the first proximity sensor, and the second proximity sensor may detect the second preset pressure value when the second piston is pushed out and aligned with the second proximity sensor.

In other embodiments, the same piston type and same proximity sensor type may be used to detect different preset pressure values. For example, the different preset pressure values may be detected and indicated using a statistical approach, where an increase in the number of pushed out pistons detected by proximity sensors (i.e., an increase in the rate of piston detection) indicates that a higher preset pressure value has been reached and an additional piston has been pushed out.

Figure 8:
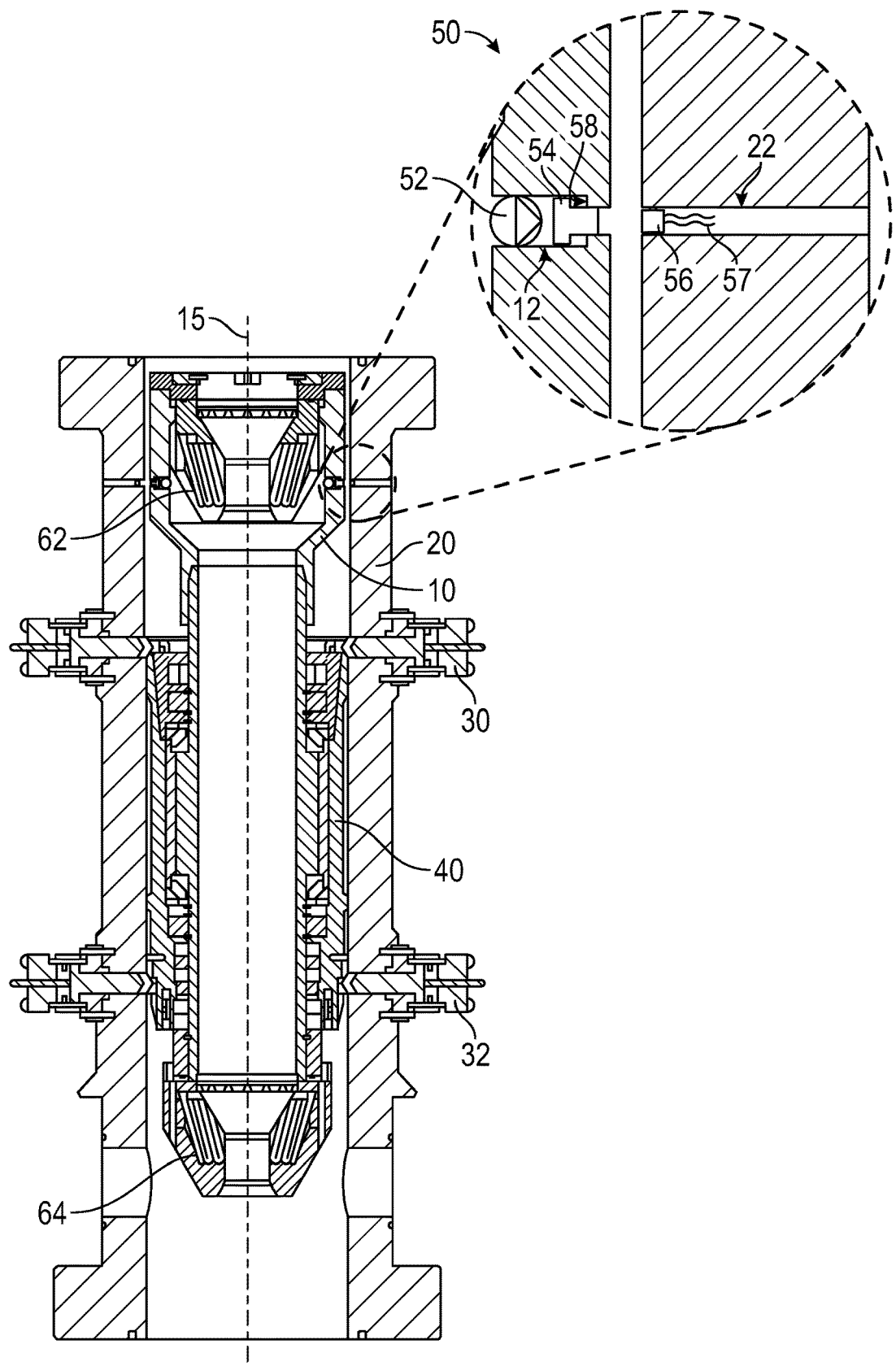
FIG. 8 shows a cross sectional view of a downhole apparatus according to embodiments of the present disclosure.

Pressure indication assemblies according to embodiments of the present disclosure may be used with different types of bearing assemblies and for different applications. For example, FIG. 8 shows a cross sectional view of a downhole apparatus having a bearing assembly with at least one pressure indication assembly assembled therein according to embodiments of the present disclosure. The downhole apparatus includes a first inner housing 10 disposed within a second outer housing 20, where the first housing 10 is rotatable along an axis of rotation 15 and the second housing 20 is non-rotating. At least one pressure indication assembly 50 is installed within the bearing assembly, the pressure indication assembly including a pressure relief valve 52 and a piston 54 disposed within a passage 12 formed through the first housing 10, and a proximity sensor 56 disposed in a passage 22 formed through the second housing 20. Two pistons 30, 32 are disposed through the second housing 20 and extend into a non-rotating holding unit 40 around the first housing 10 to lock the first housing 10 at an axial position along the axis of rotation. In locked axial position, the first housing 10 is aligned with the second housing 20, such that the piston 54 and the proximity sensor 56 share an axial position along the axis of rotation 15. As used herein, a shared axial position may include a partially overlapping axial position or a completely overlapping axial position.

In the embodiment shown, an upper sealing element 62 and a lower sealing element 64 may be disposed within the first housing 10, where the sealing elements 62, 64 may rotate with the first housing. In other embodiments, one sealing element may be disposed in the downhole apparatus or more than two sealing elements may be disposed in the downhole apparatus. A tubular member or pipe, e.g., a drill string, (not shown) may be run through the sealing elements 62, 64. In the embodiment shown in FIG. 8, when a tubular member (not shown) extends through the upper and lower sealing elements 62, 64, pressure above the upper sealing element (at the side of the upper sealing element 62 opposite the lower sealing element 64) may be atmospheric, pressure below the lower sealing element 64 (at the side of the lower sealing element 64 opposite the upper sealing element 62) may be wellbore pressure, and pressure between the upper and lower sealing elements 62, 64 may initially be atmospheric pressure, but may increase during operation. In embodiments having one sealing element, when a tubular member extends through the sealing element, pressure above the sealing element (at the side of the sealing element facing the wellbore surface) may be atmospheric pressure, and pressure below the sealing element may be wellbore pressure.

Referring still to FIG. 8, the pressure indication assembly 50 may be formed along the downhole apparatus, such that the passage 12 through the first housing 10 extends from an interior of the first housing 10, at an opening axially between the upper sealing element 62 and the lower sealing element 64, to an exit at the outer surface of the first housing 10. The passage 22 through the second housing 20 extends from an opening at the inner surface of the second housing 20, where the exit of the passage 12 in the first housing 10 shares an axial position with the opening of the passage 22 in the second housing 20. The pressure relief valve 52 is set to a preset pressure value, where once the pressure interior to the first housing 10 between the upper sealing element 62 and lower sealing element 64 reaches or exceeds the preset pressure value, the pressure relief valve 52 opens. Upon the pressure relief valve 52 opening, the pressure between the pressure relief valve 52 and piston 54 equalizes with the pressure interior to the pressure relief valve 52. The increase in pressure between the piston 54 and pressure relief valve 52 may push the piston 54 outwardly away from the pressure relief valve 52 to a blocking element 58, where the blocking element 58 prevents the piston 54 from coming out of the passage 12. Once the piston 54 is pushed out and the first housing 10 is rotated to a position where the piston 54 and the proximity sensor 56 are aligned, the proximity sensor 56 detects the piston 54, which indicates that the pressure between the upper and lower sealing elements 62, 64 and interior to the pressure relief valve 52 equals or exceeds the preset pressure value of the pressure relief valve 52. Wires 57 connected to the proximity sensor 56 may transmit the signal from the proximity sensor 56 that the piston 54 has been detected to a user or device. In other embodiments, the signal may be transmitted wirelessly to the user or device.

By detecting when the pressure between the upper and lower sealing elements 62, 64 equals or exceeds one or more preset pressure values (from one or more pressure relief valves), it may be calculated or predicted when the lower sealing element starts to fail. For example, if the pressure relief valve 52 has a preset pressure value close to the wellbore pressure, it may be determined that the lower sealing element 64 has started to fail (e.g., one or more cracks in the sealing element) when the proximity sensor 56 detects the piston 54 has been pushed out, thereby indicating that the pressure between the upper and lower sealing elements 62, 64 is approaching wellbore pressures.

In the embodiment shown in FIG. 8, the downhole apparatus is a rotating control device (RCD) including at least one pressure indication assembly according to embodiments of the present disclosure. However, pressure indication assemblies according to embodiments of the present disclosure may be used with other types of downhole apparatuses, as well as for non-drilling applications, e.g., for manufacturing applications such as in manufacturing equipment, for automotive and aerospace applications, and others.

In bearing assemblies that include one or more sealing elements, for example, to prevent entry of contaminants, to maintain certain pressure conditions, and/or to grip or manipulate sealed components using friction, access to measuring environmental conditions within the assemblies may be restricted due to the relative movements between components of the bearing assemblies. By using pressure indication assemblies of the present disclosure with such bearing assemblies, where one or more pressure relief valves and pistons are disposed in a first rotatable housing and one or more proximity switches are disposed in a second static housing, a pressure condition within the rotatable housing may be detected. One or more wires may be connected to the proximity switch(es) in the static housing to relay a signal detected from the proximity switch to a user, computer, storage device, or other computing device. In such embodiments, because the wire(s) run from the proximity switch through the static housing, the wire(s) are not manipulated by the movement of the rotatable housing. However, in some embodiments, a signal from a proximity switch may be transmitted wirelessly to a user, computer, storage device, or other computing device. In yet other embodiments, a signal from a proximity switch may be stored within the proximity switch or in a storage device connected to the proximity switch, for example, for later retrieval and/or analysis.

While the present disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

The invention claimed is:

1. An apparatus comprising:
a pressure indicator assembly disposed in a bearing, the pressure indicator assembly comprising:

a first pressure relief valve and a first piston disposed in a first passage formed in a first housing of the bearing; and a first proximity switch disposed an initial distance away from the first piston, wherein the first proximity switch is disposed in a second housing of the bearing, the first housing rotatable within the second housing about an axis of rotation, and wherein the first piston and the first proximity switch share an axial position along the axis of rotation.

2. The apparatus of claim 1, wherein the first pressure relief valve comprises a first preset pressure value, and where the first pressure relief valve opens at the first preset pressure value.

3. The apparatus of claim 1, wherein a blocking element is disposed in the first passage to block the first piston from moving past a second position, at least a portion of the first piston positioned between the blocking element and the first pressure relief valve.

4. The apparatus of claim 3, wherein frictional forces between a wall of the first passage and a contacting outer surface of the first piston hold the first piston in a first position, the second position being farther away from the first relief valve than the first position.

5. The apparatus of claim 3, wherein a retention mechanism holds the first piston in a first position within the passage, the second position being farther away from the first relief valve than the first position.

6. The apparatus of claim 5, wherein the retention mechanism comprises a spring.

7. The apparatus of claim 1, further comprising:
a second pressure indication assembly comprising a second pressure relief valve, a second piston, and a second proximity switch, the second pressure relief valve and the second piston disposed in a second passage formed in the first housing of the bearing.

8. The apparatus of claim 7, wherein the pressure indicator assembly is a multi-tier pressure indicator assembly, and wherein the second passage extends from the first passage, at a position between the first pressure relief valve and the first piston, to an opening in the first housing of the bearing.

9. The apparatus of claim 7, wherein the first passage and the second passage are radially spaced apart in the bearing.

10. The apparatus of claim 7, wherein the second pressure relief valve has a second preset pressure value higher than the first preset pressure value.

11. A method comprising:
positioning a pressure indicator assembly in a bearing;
setting a first preset pressure value of a first pressure relief valve of the pressure indicator assembly, wherein the first pressure relief valve is disposed in a first passage formed in a first housing of the bearing;
positioning a first piston of the pressure indicator assembly in a first position relative to an outlet side of the first pressure relief valve in the bearing when the pressure within the bearing at an inlet side of the first pressure relief valve is less than the first preset pressure value, wherein the first piston is disposed in the first passage formed in the first housing of the bearing; and
positioning a first proximity switch in a second housing of the bearing, wherein the first proximity switch is disposed an initial distance away from the first piston, the first housing is rotatable within the second housing about an axis of rotation, and the first piston and the first proximity switch share an axial position along the axis of rotation.

12. The method of claim 11, further comprising assembling a second pressure indicator assembly in the bearing, the second pressure indicator assembly comprising a second pressure relief valve, a second piston and a second proximity switch.

13. The method of claim 12, wherein the first pressure relief valve and the second pressure relief valve are set to different preset pressure value.

14. The method of claim 12, wherein the first proximity switch is a different type than the second proximity switch, the first proximity switch configured to detect the first piston and the second proximity switch configured to detect the second piston.

15. A method comprising:
using a first pressure indicator assembly disposed in a bearing to detect a first pressure value, the first pressure indicator comprising a first pressure relief valve, a first piston, and a first proximity switch;
moving the first piston in a direction away from an outlet side of the first pressure relief valve when the first pressure value within the bearing at an inlet side of the first pressure relief valve reaches a first preset pressure value; and
indicating the first pressure value within the bearing is greater than or equal to the first preset pressure value of the first pressure relief valve when the first piston moves towards the first proximity switch.

16. The method of claim 15, further comprising transmitting a signal from the first proximity switch to indicate that the first piston has been detected and to indicate the pressure within the bearing.

17. The method of claim 15, further comprising detecting a pressure range within the bearing, the detecting comprising:
setting the first preset pressure value of the first pressure relief valve equal to a lower value of the pressure range;
setting a second preset pressure value of a second pressure relief valve equal to an upper value of the pressure range; and
positioning a second piston and the second pressure relief valve within the bearing;
moving the second piston in a direction away from the second pressure relief valve when the pressure in the bearing adjacent the second pressure relief valve reaches the second preset pressure value; and
indicating the pressure within the bearing has reached the upper value of the pressure range when the second piston moves away from the second pressure relief valve and towards the second proximity switch.

18. The method of claim 17, further comprising detecting a third pressure value with a third pressure indicator assembly, the third pressure indicator assembly comprising a third pressure relief valve, a third piston, and a third proximity switch.

* * * * *